E. STICHELBAUT.
MOLDING MACHINE.
APPLICATION FILED AUG. 18, 1915.
1,200,998.
Patented Oct. 10, 1916.
6 SHEETS—SHEET 4.
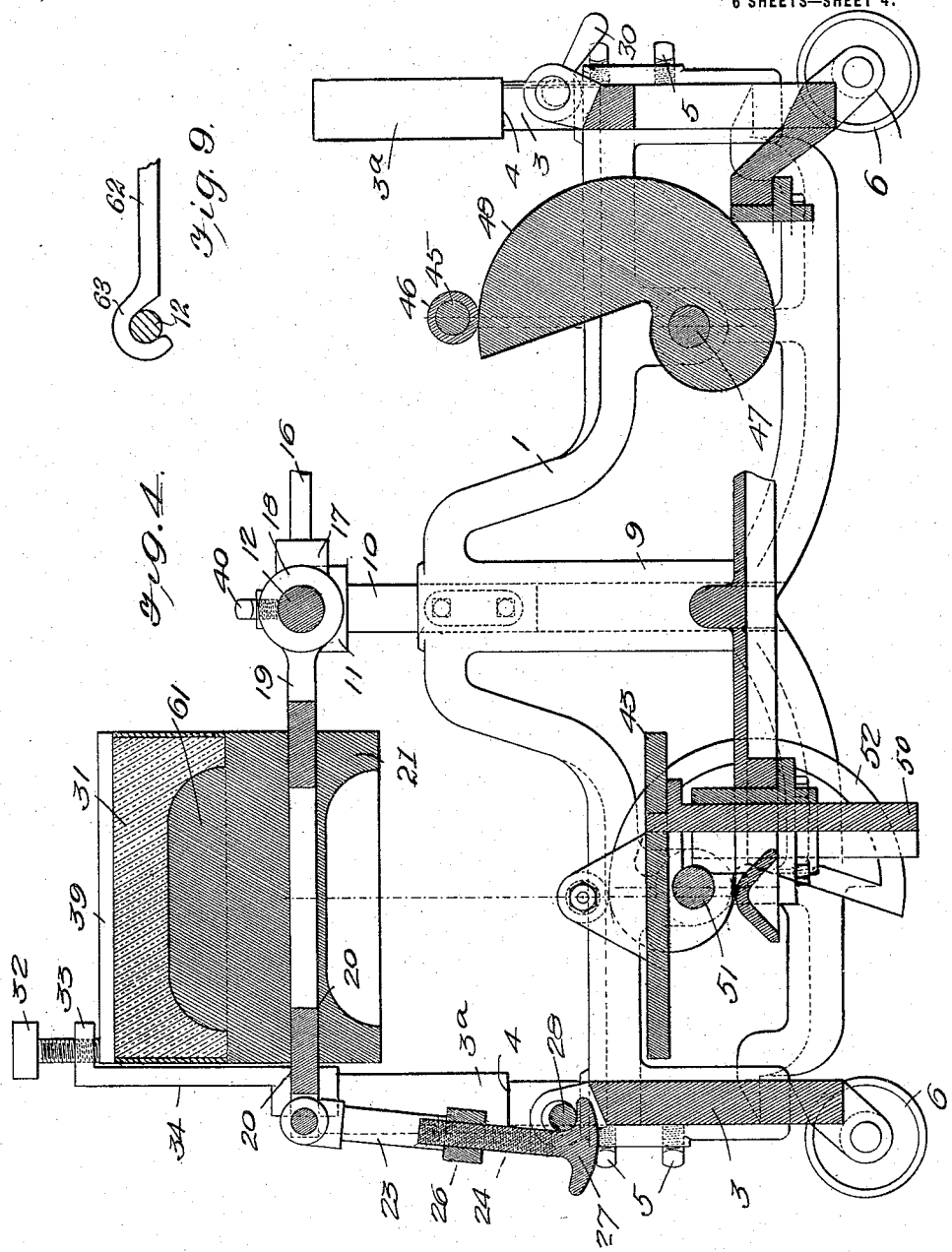
WITNESSES:
F. C. Barry
C. E. Trainor
INVENTOR.
Eugène Stichelbaut
BY Munn & Co.
ATTORNEYS

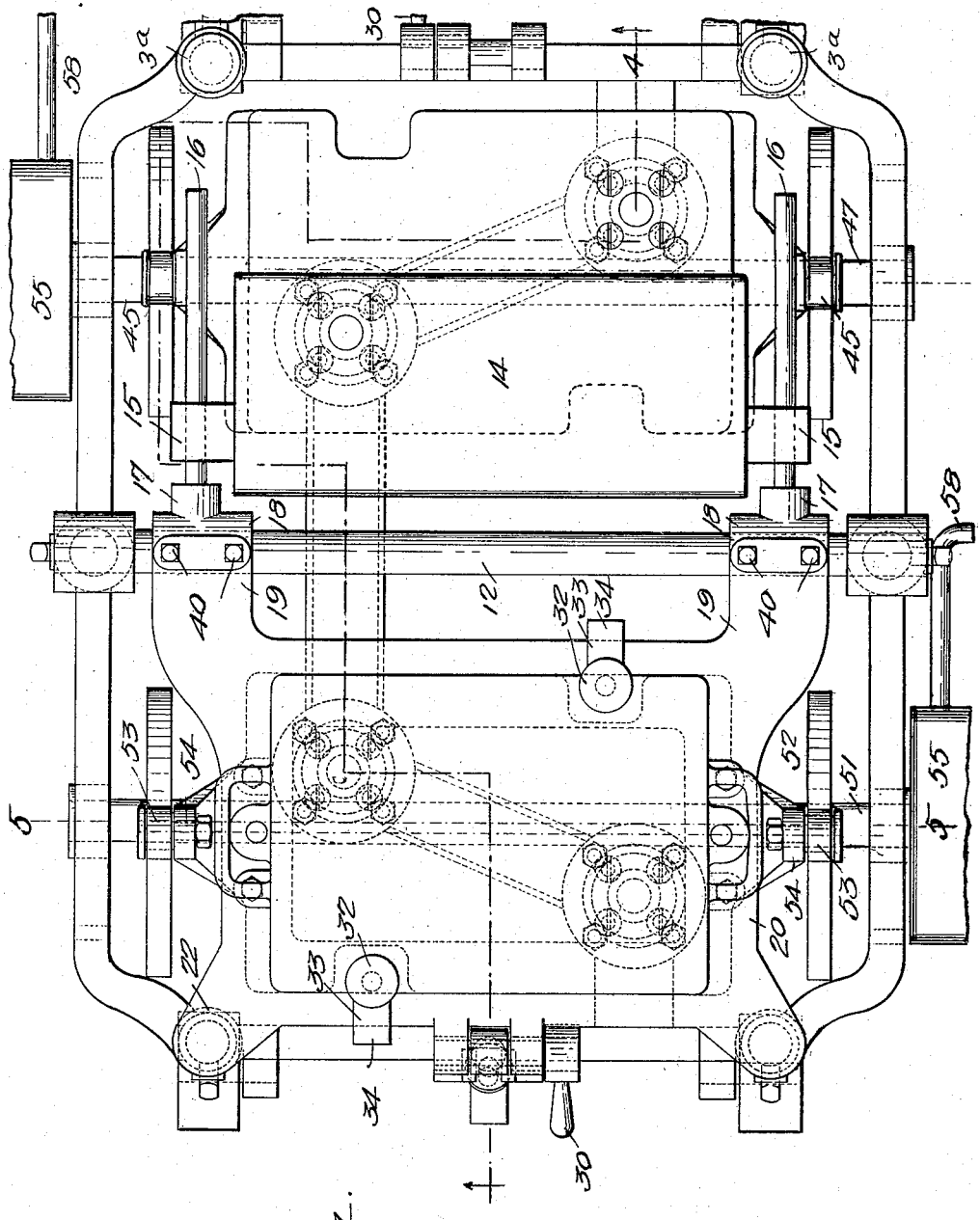

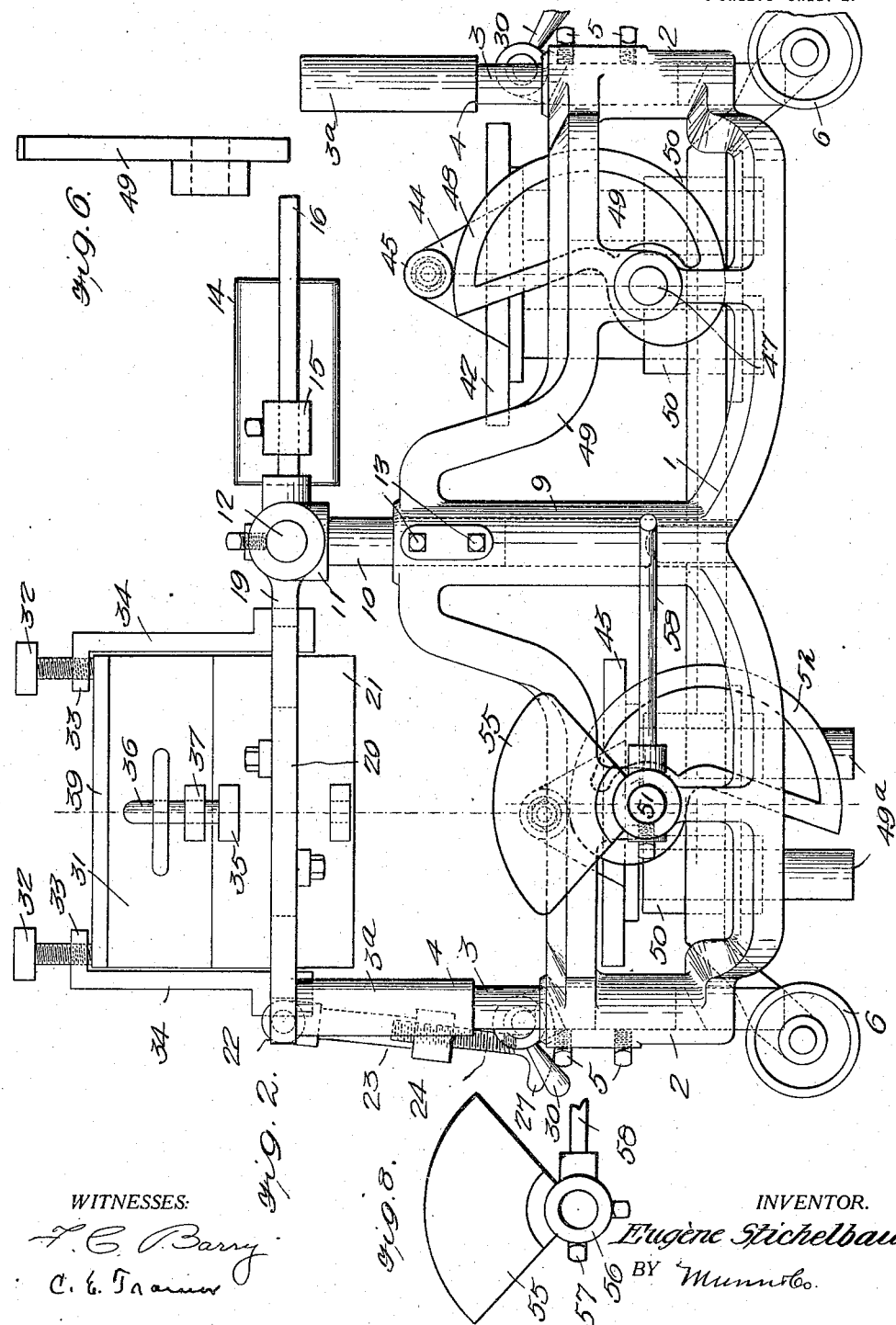

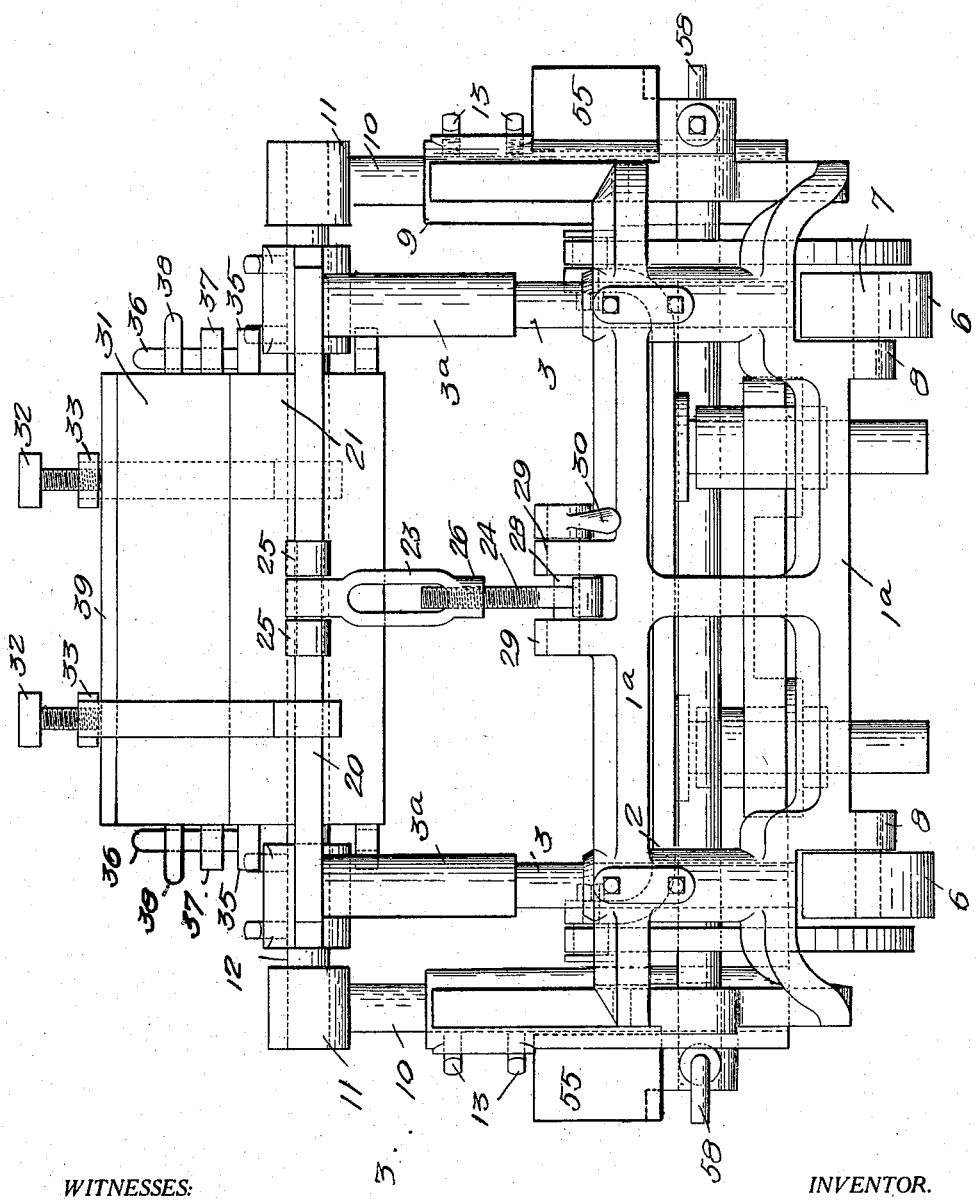

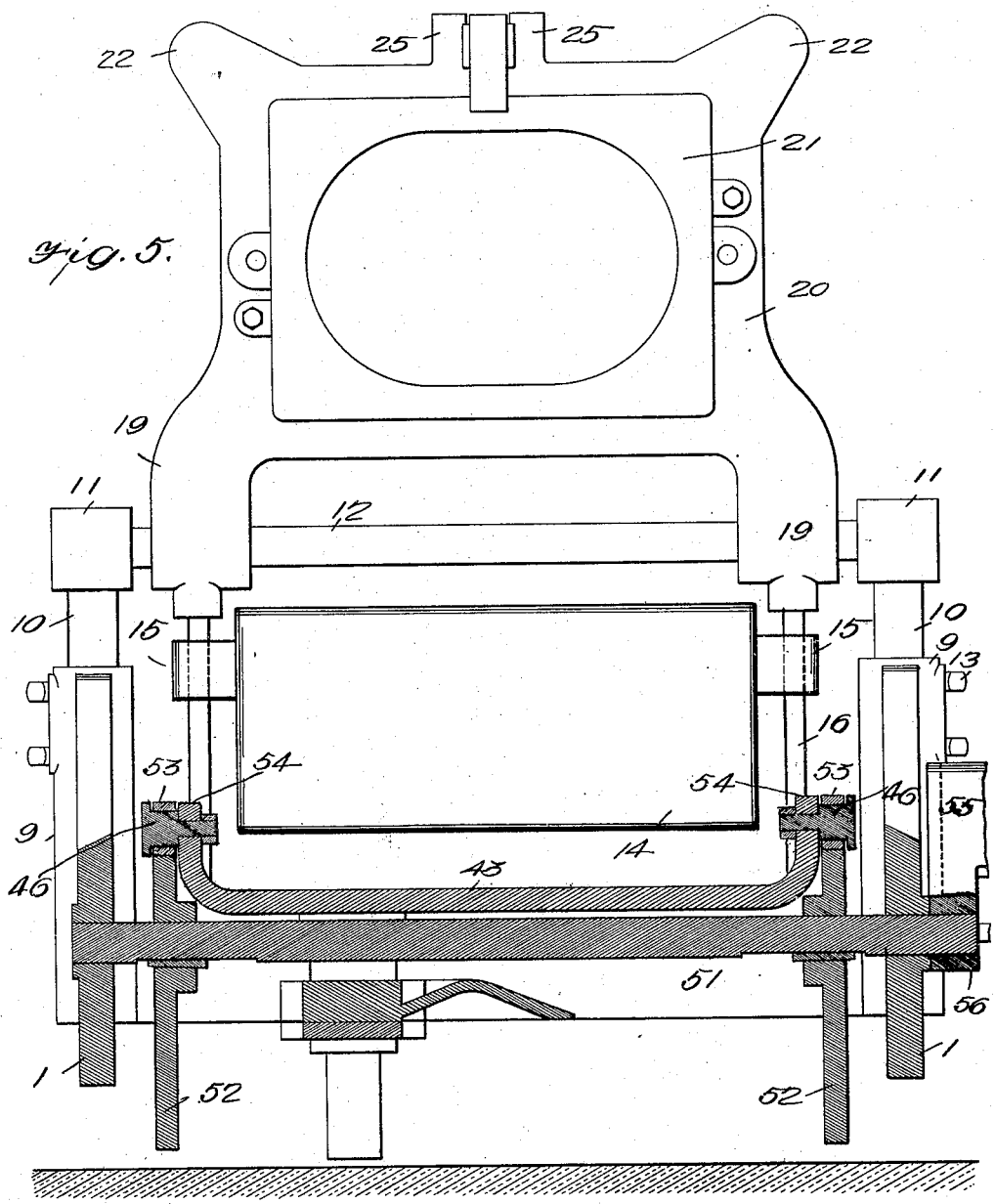

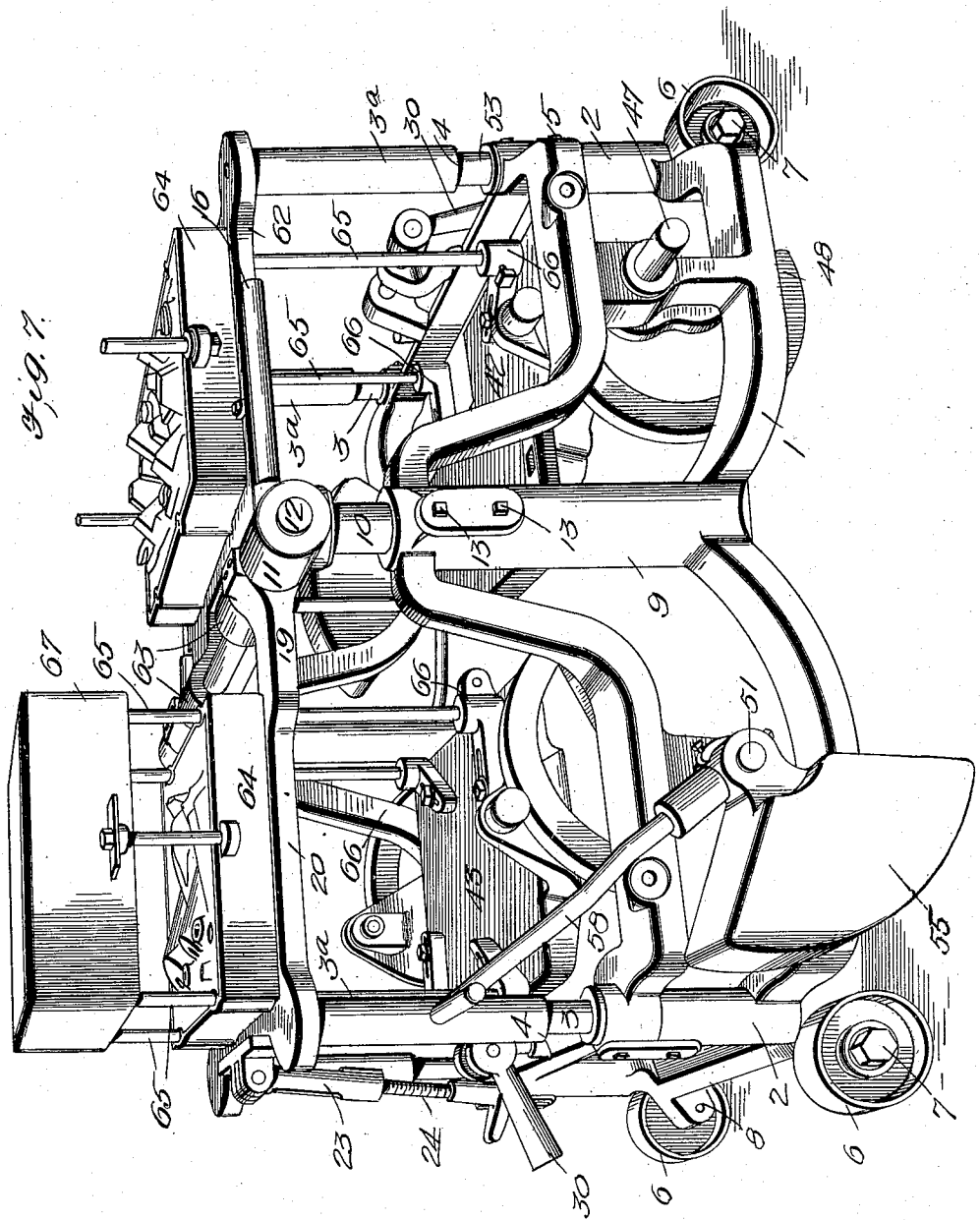

UNITED STATES PATENT OFFICE.

EUGÈNE STICHELBAUT, OF CHICAGO, ILLINOIS.

MOLDING-MACHINE.

1,200,998.     Specification of Letters Patent.     Patented Oct. 10, 1916.

Application filed August 18, 1915. Serial No. 46,176.

*To all whom it may concern:*

Be it known that I, EUGÈNE STICHELBAUT, a citizen of France, and a resident of Chicago, in the county of Cook and State of Illinois, have invented certain new and useful Improvements in Molding-Machines, of which the following is a specification.

My invention is an improvement in molding machines, and the invention has for its object to provide a machine of the character specified which may be used for rockover molding, stripping plate and plain pattern plate molding, the machine comprising a supporting frame having an adjustable swinging table mounted on the opposite sides of which are pattern plates to permit the plates to be used alternately as the table is swung from side to side of the frame, the table, the pattern plates and the mold being counterbalanced by an adjustable counterweight to swing the table.

In the drawings: Figure 1 is a top plan view of the molding machine; Fig. 2 is a front view; Fig. 3 is an end view; Figs. 4 and 5 are sections on the lines 4—4 and 5—5, respectively, of Fig. 1, Fig. 4 looking in the direction of the arrows adjacent to the line; Fig. 6 is a side view of the cam, Fig. 7 is a perspective view of a modified arrangement, Fig. 8 is a front view of the cam, and Fig. 9 is a detail view showing one of the open bearings for the detachable molding table.

The present embodiment of the invention comprises a frame consisting of side frames 1 and connecting end frames 1ª, the said side and end frames being a continuous integral structure, and at each corner of the frame a vertical bearing 2 is provided, in which is mounted to move the reduced portion 3 of a leg, each leg comprising the reduced portion 3 and a body 3ª. The legs are adapted to be raised or lowered in the bearings to support the molding table to be later described.

The legs are held in adjusted position by means of set screws 5, and there is an annular shoulder 4 on each leg formed between the portions 3 and 3ª. The set screws 5 are threaded through the bearings into engagement with the legs, and wheels 6 are provided for supporting the frame. Each of these bearing wheels 6 is journaled on a stub shaft 7 mounted in a bearing lug 8 depending from the frame, and each of the side frames 1 of the main frame, has a central vertical bearing 9, in which is mounted for vertical movement a post 10, for a purpose to be presently described. These posts 10 have bearings 11 at their upper ends, and a shaft 12 is journaled in the bearings transversely of the frame at the center thereof. It will be noticed from an inspection of Fig. 3, that the bearings 9 are offset outwardly beyond the legs 3—3ª, and these posts 10 are held in adjusted position by means of set screws 13 which are threaded through the bearings into engagement with the posts. This shaft 12 assists in supporting the pattern plate 21 and the mold 31, and the said parts are balanced by a counter-weight 14. This weight has bearings 15 at its ends, which are mounted to slide on rods 16 extending radially from the shaft 12, the inner ends of the rods being held in bearing nipples 17 on sleeves 18 on the shaft. Bracket arms 19 extend from the bearing sleeves 18 in the opposite direction to the rods 16, and these arms are connected to a bracket or molding table 20 which supports the pattern plates 21 and 61, the plate 61 being above and the plate 21 below the table. The bracket has lugs 22 at the opposite side from the shaft, which are adapted to rest upon the upper ends of the legs 3—3ª at the opposite ends of the frame when the pattern and bracket are swung in a manner to be later described.

The bracket 20 is locked in either position by means of the lock shown in Figs. 2, 3 and 4. This lock comprises a sectional or telescoping arm consisting of sections 23 and 24. The section 23 of the arm is journaled at one end between a pair of bearing lugs 25 at the outer edge of the bracket 20, and at the other edge the said section carries a nut 26 into which one end of the section 24 is threaded. The other end of the section 24 has a cross head 27, as shown, which is adapted to be engaged at either end of the arm by a locking shaft 28. Each of these locking shafts is journaled in spaced bearing lugs 29 on the frame, and each shaft has a handle 30 at one end, for convenience in manipulating the same.

It will be noted that the shaft 28 is reduced intermediate its ends, and that the reduced portion is eccentric to the body of the shaft. When the shaft is oscillated in one direction, it will engage one end of the cross head and will clamp the bracket plate on the upper ends of the legs 3ª. When the shaft is oscillated in the opposite direction, it will release the cross head.

The mold 31 is adapted to be clamped on the pattern plate by means of set screws 32, which are threaded through angular lugs 33 on the upper ends of clamping standards 34 connected with the bracket 20 at opposite sides thereof. These arms 34 are offset transversely of the table with respect to each other, and it will be evident that when the mold is in place on the pattern plate and the set screws are turned downward, the mold will be clamped onto the pattern plate.

The pattern plates 21 and 64 have lugs 35 at their ends, and each lug has an upwardly extending pin 36 which is adapted to pass through a perforated lug 37 on the mold 31, to properly center the mold with respect to the pattern plate, and the mold has handles 38 at its ends for convenience in manipulating the same.

The bottom board 39 is arranged on top of the flask or mold, and the set screws 32 engage this board. The bearing sleeves 18 of the arms 19 are secured to the shaft by means of set screws 40, and by loosening the screws the bearings may be adjusted with respect to the shaft.

Two drawing tables 42 and 43 are provided, the said tables being at opposite ends of the machine, and within the frame. One of the tables 42 has its ends upturned as shown at 44, and rollers 45 are journaled on the upturned ends. It will be noticed that each roller is mounted on a journal pin 46 connected with the adjacent upturned end of the table, and a shaft 47 is journaled in the frame below the table. An eccentric 48 is arranged on each end of the shaft, and each eccentric engages the adjacent roller as shown in Fig. 4. It will be evident that when the shaft 47 is oscillated in one direction, the table will be raised, and when it is oscillated in the opposite direction the table will be lowered. The table has depending legs 49, which move in guides 50 held by the frame, and the legs guide the table in its rising and falling movement. The table 43 is also provided with depending legs 49ª, which move in guides 50ª on the frame to guide the table in its vertical movement. A shaft 51 is journaled below the table 43, in bearings in the frame, and cams 52 are secured to the shaft, the said cams engaging rollers 53 on the upturned ends 54 of the table. The tables are similar in arrangement, and in mounting, and it will be noticed from an inspection of Fig. 5, that each roller 45 and 53 is mounted on a journal pin 46 held in the adjacent upturned end of the adjacent table. A counter-weight 55 is connected with one end of each of the shafts 47 and 51. Each counter-weight has a bearing 56 engaging the shaft and secured thereon by a set screw 57, and a crank 58 is connected to the bearing of each counter-weight on each of the shafts. By means of the crank 58 either shaft may be oscillated to raise or lower the table, and the counter-weight being arranged above the shaft when the table is in lowered position, tends to balance the weight of the table.

In operation, the molding table is arranged as shown in Fig. 4, and the counter-weight 14 is adjusted to overbalance the mold table 20, the patterns and the flask. The flask is filled with sand in the usual manner, the bottom board 39 is set and clamped by the clamping mechanism 32, and the mold is now ready to be rocked over.

The bracket 20 is released by means of the handle 30, and the counter-weight having been set as above mentioned, to overbalance the mold table and connected parts, will immediately rock the mold table into the position of Fig. 5. The operator now moves to the other end of the machine, that is, from the left of Fig. 2 to the right. When at this end the operator brings the bracket or mold table 20 over to the opposite end of the machine from that shown in Fig. 2, and locks it in place by means of the locking mechanism 23—24. He now raises the table 43, by means of the lever 58. When this lever is rocked over, from the position shown at the left of Fig. 2 to the opposite side of the shaft 51, the table will be lifted, and the counter-weight 55 connected with the lever is of sufficient weight to hold the table lifted under conditions to be described. The table is raised until it contacts with the bottom board 39, which is now on the under side of the flask, and the counter-weight 55 makes enough pressure to hold the table in place. The mold is now beneath the molding table instead of above, and is ready to be drawn although it is still clamped. The pattern plate 21, which was beneath the mold table at the beginning of the above described operation, is now above the mold table, while the mold 31, which was above the table is now below. The pattern plate 21 is now molded in the same manner as before. The table 43 is now lowered by rocking the lever 58 in the opposite direction, and the mold will be drawn from the pattern 61. The pattern plate 21 is now ready to be rocked over to the position shown in Fig. 4, and the locking mechanism 23—24 is released to permit the counter-weight 14 to rock the table into the position of Fig. 5.

Every time the mold table swings over a mold is made, and there is no lost motion. When the machine is transformed into a stripping or plain plate machine, a second table 62, corresponding to the table or bracket 20 is arranged at the opposite side, the counter-weight 14 being removed. This table, as shown in Fig. 7, has open bearings 63 which will engage the shaft 12 inside of the bearings for the arms 19, with the outer end resting upon the elements 3ᵃ.

A pattern plate is arranged on each table, and pins 65 are connected with step bearing brackets 66, which are connected to the tables 42 and 43. These pins are of a length to engage the mold 67 to lift the same during stripping. The lower ends of the pins rest in the bearings and the upper ends engage the mold as shown. It will be evident that when the table is lifted, the mold will be drawn, extending on the upper ends of the pins.

It will be understood that the mold material is compacted by hand, the machine being a handramming molding machine.

I claim:—

1. A molding machine, comprising a wheel supported frame having bearings at its corners, legs mounted to slide in the bearings, means for holding the legs in adjusted position, a shaft journaled transversely of the frame intermediate the ends thereof, a molding table secured to the shaft and extending radially therefrom, a counterweight adjustably connected with the shaft at the opposite side from the said table and arranged to overbalance the said table to permit the said table to be swung to either side, the free end of the said table resting upon the upper ends of the legs, means for locking the molding table at either end of the frame, a drawing table at each side of the shaft, and means for moving the drawing tables upwardly to engage the flask on the under side of the molding table, said means being counterbalanced to hold the tables in upward position, the moving means for each drawing table comprising a shaft journaled transversely of the frame beneath the said table, a pair of similar cams on each shaft, each drawing table having rollers at its ends engaged by the cams, a counterweight secured to each shaft for holding the table elevated, and a lever secured to each shaft for oscillating the same.

2. A molding machine, comprising a wheel supported frame having bearings at its corners, legs mounted to slide in the bearings, means for holding the legs in adjusted position, a shaft journaled transversely of the frame intermediate the ends thereof, a molding table secured to the shaft and extending radially therefrom, the free end of the molding table resting upon the upper ends of the legs, means for locking the molding table at either end of the frame, a drawing table at each side of the shaft, and means for moving the drawing tables upwardly to engage the flask on the under side of the molding table, said means being counterbalanced to hold the drawing tables in upward position, said counterweight for the molding table being detachable from the shaft, and a second molding table having open bearings for engaging the shaft of the first-named molding table, and adapted to rest at its outer end on the legs, step bearings detachably connected with each drawing table, and stripping pins seated in the bearings.

3. A molding machine, comprising a wheel supported frame having bearings at its corners, legs mounted to slide in the bearings, means for holding the legs in adjusted position, a shaft journaled transversely of the frame intermediate the ends thereof, a molding table secured to the shaft and extending radially therefrom, a counterweight adjustably connected with the shaft at the opposite side from the said table and arranged to overbalance the said table to permit the molding table to be swung to either side, the free end of the molding table resting upon the upper ends of the legs, means for locking the said table at either end of the frame, a drawing table at each side of the shaft, and means for moving the drawing tables upwardly to engage the flask on the under side of the molding table, said means being counterbalanced to hold the drawing tables in upward position, said counterweight for the molding table being detachable from the shaft, and a second molding table having open bearings for engaging the shaft of the first-named table, and adapted to rest at its outer end on the legs.

4. A molding machine, comprising a wheel supported frame having bearings at its corners, legs mounted to slide in the bearings, means for holding the legs in adjusted position, a shaft journaled transversely of the frame intermediate the ends thereof, a molding table secured to the shaft and extending radially therefrom, a counterweight adjustably connected with the shaft at the opposite side from the said table and arranged to overbalance the same to permit the molding table to be swung to either side, the free end of the molding table resting upon the upper ends of the legs, means for locking the molding table at either end of the frame, a drawing table at each side of the shaft, and means for moving the said drawing tables upwardly to engage the flask on the under side of the molding table, said means being counterbalanced to hold the drawing tables in upward position.

5. A molding machine, comprising a wheel-supported frame having bearings at its corners, legs mounted to slide in the bearings, means for holding the legs in adjusted position, a shaft journaled transversely of the frame intermediate the ends thereof, a molding table secured to the shaft and extending radially therefrom, a counterweight adjustably connected with the shaft at the opposite side from the molding table and arranged to overbalance the molding table to permit the molding table to be swung to either side, the free end of the said table resting upon the upper ends of the legs, means for locking the molding table at either end of the frame, a drawing table at each side of the shaft, and means for moving the drawing tables upwardly to engage the flask on the under side of the molding table, said means being counterbalanced to hold the drawing tables in upward position.

6. A molding machine comprising a frame, a shaft journaled transversely of the frame intermediate the ends thereof, a molding table extending radially from the shaft, said frame having supports at each end for the outer end of the molding table, a counter-balance adjustably connected with the shaft and adapted to overbalance the molding table and the mold thereon, a drawing table arranged in the frame at each side of the shaft, and means for raising and lowering each drawing table, each of the said means being counter-balanced to hold the drawing table elevated.

7. A molding machine, comprising a frame, a shaft journaled transversely of the frame intermediate the ends thereof, a molding table extending radially from the shaft, said frame having supports at each end for the outer end of the table, a counterbalance detachably connected with the shaft and adapted to overbalance the table and the mold thereon, a drawing table arranged within the frame at each side of the shaft, and means for raising and lowering each drawing table.

8. A molding machine, comprising a wheel supported frame, said frame having vertical bearings at its corners, legs movable in the bearings, means for securing the legs in adjusted position in the bearings, said frame having a vertical bearing intermediate its ends at each side, a post in each bearing, means for holding each post in adjusted position, a shaft journaled transversely of the frame in the upper ends of the posts, a molding table extending radially from its shaft, a counterweight adjustably connected with the shaft on the opposite side from the table, and arranged to overbalance the table with the mold thereon, said table resting at its outer end on the legs at each end of the frame, and means for locking the table at either end of the frame.

9. A molding machine, comprising a frame, a molding table journaled at one end on the frame intermediate the ends of the frame to swing from one end of the frame to the other end, a counterweight adjustably connected with the table for counterbalancing the same, said table being adapted to carry a mold on each face, drawing tables arranged within the frame at each end thereof, means for moving each drawing table vertically and counterbalanced to hold the drawing table in upward position to receive and draw the mold, and means for locking the molding table at either end of the frame.

10. A molding machine, comprising a frame, a molding table journaled at one end on the frame intermediate the ends of the frame to swing from one end of the frame to the other end, a counterweight adjustably connected with the table for counterbalancing the same, said table being adapted to carry a mold on each face, drawing tables arranged within the frame at each end thereof, and means for moving each drawing table vertically and counterbalanced to hold the drawing table in upward position to receive and draw the mold.

11. A molding machine, comprising a frame, a shaft journaled transversely of the frame intermediate the ends thereof, a molding table extending radially from the shaft and mounted to swing toward either end of the table, a counterbalance adjustably connected with the shaft at the opposite end of the table for counterbalancing the table and the mold, said frame having supports at each end for engaging the outer end of the table to support the same in horizontal position, a second table adapted to take the place of the weight, and having open bearings for engaging the shaft, and means adjustable beneath the tables at each end of the frame for stripping the molds, said means comprising vertically movable drawing tables, and means for moving the drawing tables, and stripping rods detachably connected with the drawing tables.

12. A molding machine, comprising a frame, a shaft journaled transversely of the frame intermediate the ends thereof, a molding table extending radially from the shaft and mounted to swing toward either end of the table, a counterbalance adjustably connected with the shaft at the opposite side from the table for counterbalancing the table and the mold, said frame having supports at each end for engaging the outer end of the table to support the same in horizontal position, a second table adapted to take the place of the weight, and having open bearings for engaging the shaft, and means adjustable beneath the tables at each end of the frame for stripping the molds.

13. A molding machine, comprising a frame, a molding table mounted to swing from end to end of the frame, said frame having means for supporting the table in horizontal position at either end of the frame, a counterbalance in connection with the table, a second molding table having means for detachably engaging the connection of the first named table with the frame, and stripping means at each end of the frame beneath the adjacent molding table.

14. A molding machine, comprising a frame, a molding table mounted to swing from end to end of the frame, said frame having means for supporting the table in horizontal position at either end of the frame, a second table having means for detachably engaging the connection of the first-named molding table with the frame, and stripping means at each end of the frame beneath the adjacent molding table.

15. A molding machine, comprising a frame, a molding table mounted to swing from end to end of the frame to reverse the position of the table, a counterbalance for swinging the table, a drawing table within the frame at each end thereof and adapted to coöperate with the molding table when at the said end of the frame for drawing the mold, and means for lifting each drawing table and holding it in adjusted position, said means comprising a shaft journaled beneath each drawing table and provided with cams, each drawing table having rollers for engagement by the cams, a radial handle on each shaft for oscillating the shaft to lift the table, and a counterbalance in connection with each shaft for holding the table in adjusted position.

16. A molding machine, comprising a frame, a molding table mounted to swing from end to end of the frame to reverse the position of the table, a counterbalance for swinging the table, a drawing table within the frame at each end thereof and adapted to coöperate with the molding table when at the said end of the frame for drawing the mold, and means for lifting each drawing table and having means in connection therewith for holding the table in adjusted position.

17. A molding machine, comprising a frame, a molding table mounted to swing from end to end of the frame to reverse the position of the table, a counterbalance for swinging the table, a drawing table within the frame at each end thereof and adapted to coöperate with the molding table when at the said end of the frame for drawing the mold, and means for lifting each drawing table and holding it in adjusted position.

18. A molding machine, comprising a frame, a molding table mounted to swing from end to end of the frame to reverse the position of the table, a counterbalance for swinging the table, a drawing table within the frame at each end thereof and adapted to coöperate with the molding table when at the said end of the frame for drawing the mold, means for lifting each drawing table and holding it in adjusted position, brackets detachably connected with each drawing table at the corners thereof, and pins in the brackets for drawing the mold.

EUGÈNE STICHELBAUT.

Witnesses:
 D. A. ARVILLE,
 A. E. LEVER.

Copies of this patent may be obtained for five cents each, by addressing the "Commissioner of Patents, Washington, D. C."